(12) United States Patent
Saito et al.

(10) Patent No.: US 10,240,810 B2
(45) Date of Patent: Mar. 26, 2019

(54) DISPLAY DEVICE AND APPLICATION PROGRAM

(71) Applicant: Johnson Controls-Hitachi Air Conditioning Technology (Hong Kong) Limited, Hong Kong (CN)

(72) Inventors: Emi Saito, Tokyo (JP); Naoya Sugiyama, Tokyo (JP); Katsuya Miyata, Tokyo (JP); Makoto Itoh, Tokyo (JP); Shinya Suenaga, Tokyo (JP); Tatsuya Sugiyama, Tokyo (JP)

(73) Assignee: Hitachi-Johnson Controls Air Conditioning, Inc., Tokyo (JP)

( * ) Notice: Subject to any disclaimer, the term of this patent is extended or adjusted under 35 U.S.C. 154(b) by 238 days.

(21) Appl. No.: 15/113,246

(22) PCT Filed: Jan. 27, 2014

(86) PCT No.: PCT/JP2014/051604
§ 371 (c)(1),
(2) Date: Jul. 21, 2016

(87) PCT Pub. No.: WO2015/111204
PCT Pub. Date: Jul. 30, 2015

(65) Prior Publication Data
US 2017/0010016 A1  Jan. 12, 2017

(51) Int. Cl.
*F24F 11/30* (2018.01)
*F24F 11/52* (2018.01)
(Continued)

(52) U.S. Cl.
CPC ............... *F24F 11/30* (2018.01); *F24F 11/52* (2018.01); *G06F 3/0482* (2013.01); *G06F 3/0485* (2013.01)

(58) Field of Classification Search
CPC .... F24F 11/52; G06F 3/0482; G06F 3/04842; G06F 2203/04803
(Continued)

(56) References Cited

U.S. PATENT DOCUMENTS 8,255,238 B2 * 8/2012 Powell .................. G01D 21/00
705/3
2006/0123808 A1  6/2006 Kim et al.
(Continued)

FOREIGN PATENT DOCUMENTS

CN          1786605 A         6/2006
CN          1900614 A         1/2007
(Continued)

OTHER PUBLICATIONS

English translation of JP2007315681A.*
(Continued)

*Primary Examiner* — Frantz F Jules
*Assistant Examiner* — Schyler S Sanks
(74) *Attorney, Agent, or Firm* — Mattingly & Malur, PC

(57) ABSTRACT

The present invention is intended to provide a general-purpose display device that is able to display on a display unit easily operating information required for assessing a test operation state, and an application program to be executed by the display device. Accordingly, in this display device which displays on the display unit the operating information of an air conditioner in which an outdoor unit provided with an outdoor heat exchanger and an indoor unit provided with an indoor heat exchanger are connected by a refrigerant pipe and a refrigerant is circulated by a compressor, a control unit of the display device controls the display unit so that time information is displayed horizontally and a first operating information display area and a second operating information display area for displaying first operating
(Continued)

information and second operating information, respectively, corresponding to the time information are displayed vertically side by side.

8 Claims, 6 Drawing Sheets

(51) Int. Cl.
*G06F 3/0482* (2013.01)
*G06F 3/0485* (2013.01)

(58) Field of Classification Search
USPC .................................................. 62/127, 129
See application file for complete search history.

(56) References Cited

U.S. PATENT DOCUMENTS

| 2009/0140056 | A1* | 6/2009 | Leen | G05B 13/02 |
| | | | | 236/49.3 |
| 2010/0169832 | A1* | 7/2010 | Chang | G06F 3/0482 |
| | | | | 715/811 |
| 2011/0218681 | A1* | 9/2011 | Jung | F24F 11/30 |
| | | | | 700/276 |
| 2012/0101778 | A1* | 4/2012 | Gyota | F24F 11/0086 |
| | | | | 702/183 |
| 2012/0186287 | A1 | 7/2012 | Kawai | |
| 2012/0187201 | A1* | 7/2012 | Kawai | F24F 11/006 |
| | | | | 236/51 |
| 2012/0272186 | A1* | 10/2012 | Kraut | G06F 3/0488 |
| | | | | 715/810 |
| 2013/0111389 | A1* | 5/2013 | Aydin | G06T 11/206 |
| | | | | 715/772 |
| 2014/0137583 | A1* | 5/2014 | Kim | F25B 49/00 |
| | | | | 62/126 |

FOREIGN PATENT DOCUMENTS

| JP | 05-143112 A | | 6/1993 |
| JP | 10-267327 A | | 10/1998 |
| JP | 2001-337090 A | | 12/2001 |
| JP | 2005-291610 A | | 10/2005 |
| JP | 2007-205649 A | | 8/2007 |
| JP | 2007-315681 A | | 12/2007 |
| JP | 2007315681 A | * | 12/2007 |
| JP | 2012-149855 A | | 8/2012 |
| JP | 2013-024546 A | | 2/2013 |
| WO | 2007/032594 A2 | | 3/2007 |

OTHER PUBLICATIONS

International Search Report of PCT/JP2014/051604 dated Mar. 18, 2014.
Chinese Office Action received in corresponding Chinese Application No. 201480073945.4 dated Aug. 3, 2018.

\* cited by examiner (a)

(b)

DISPLAY DEVICE AND APPLICATION PROGRAM

CROSS-REFERENCE TO RELATED APPLICATIONS

The present application claims priority under 35 U.S.C § 119 to Japanese patent Application No. 2014-051604, filed on Jan. 27, 2014, entitled "DISPLAY DEVICE AND APPLICATION PROGRAM". The contents of this application are incorporated herein by reference in their entirely.

TECHNICAL FIELD

The present invention relates to a display device and an application program run thereby.

BACKGROUND ART

Japanese Unexamined Patent Application Publication No. 2013-24546 discloses the background art of the present technical field. This publication describes in paragraph 57 as "As mentioned above, data is collectively obtained from the centralized control devices 200a-200c connectable on a network, and the data interface server 500 can be responded to the communication equipment 300a and 300b. Therefore, for example, a serviceman only accesses the opportunity at the time of a pilot run of air-conditioning equipment, or a maintenance using the communication equipment 300a and 300b to the data interface server 500 in a building, It is possible to acquire the connection information and individual identification information of all the air-conditioning equipment [101a-101d and 102a-102d] in a building."

CITATION LIST

Non Patent Literature

Patent document 1: Japanese Unexamined Patent Application Publication No. 2013-24546

SUMMARY OF THE INVENTION

Technical Problem

It is necessary to perform an operation check by a test operation in a constructed air conditioner. Though Patent document 1 describes that identification information of an air conditioner is obtained by a communication device in a test operation, the operating information required for assessing a test operating status isn't obtained.

Thus, the present invention is able to provide a display device capable of displaying operating information required for assessing a test operation status on a display unit of a general-purpose display device in an easily understandable manner, and an application program executed by the display device.

Solution to Problem

To solve the foregoing problem, such configurations as described in the claim will be adopted.

The present application includes a plurality of means to solve the foregoing problem, and one example of the means is "controlling the display device which displays on the display unit the operating information of an air conditioner in which an outdoor unit provided with an outdoor heat exchanger and an indoor unit provided with an indoor heat exchanger are connected through refrigerant pipes and a refrigerant is circulated by a compressor, a control unit of the display device controls the display unit so that time information is displayed horizontally and a first operating information display area for displaying first operating information and a second operating information display area for displaying second operating information respectively for the time information are displayed vertically side by side".

Advantageous Effects of the Invention

The present invention is able to provide a display device capable of displaying operating information required for assessing a test operation status on a display unit of a general-purpose display device in an easily understandable manner, and an application program executed by the display device.

The problems, configurations, and advantageous effects other than those described above will become apparent by the following descriptions of the embodiments.

DESCRIPTION OF EMBODIMENTS

Figure 1:
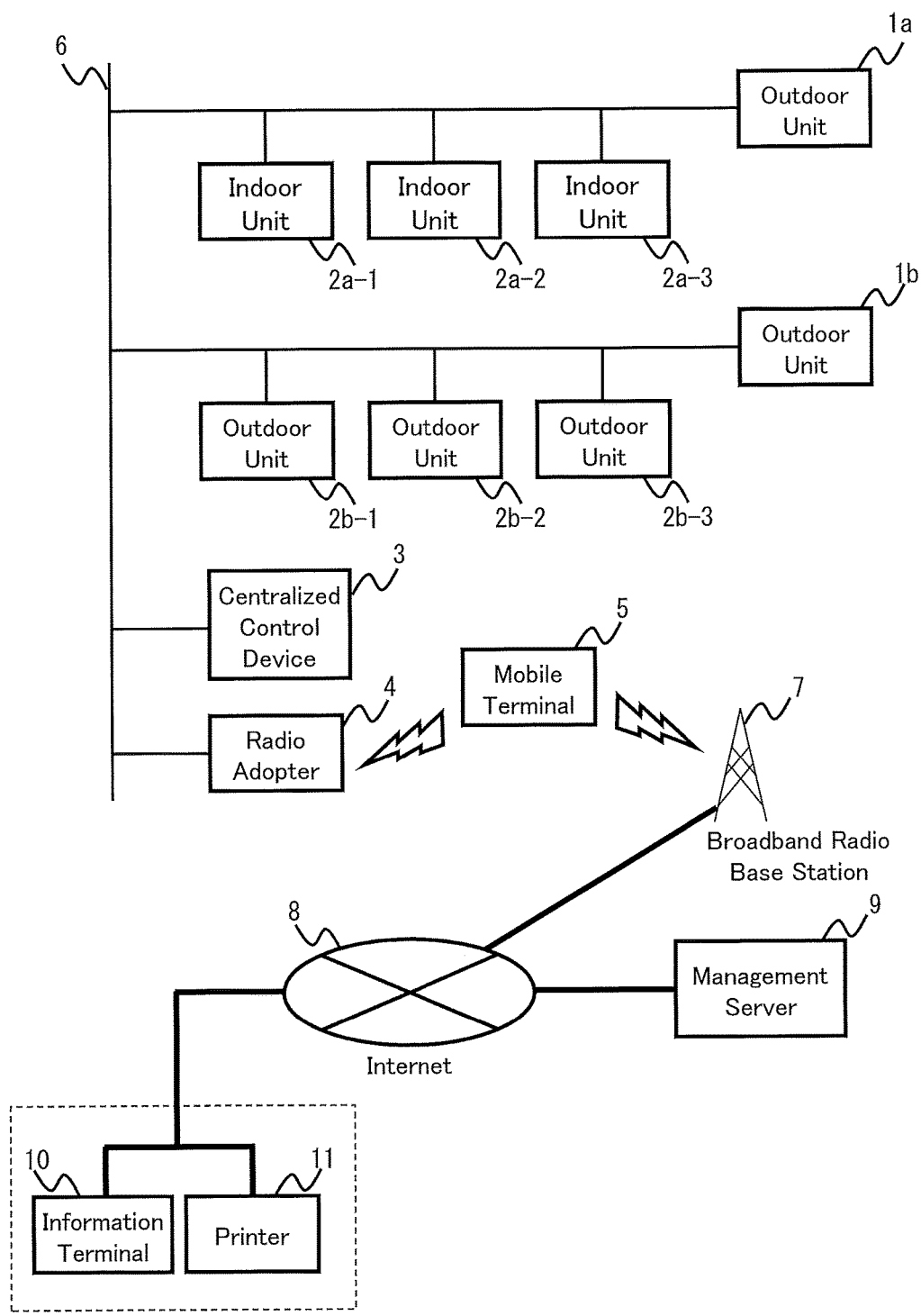
FIG. 1: an example of configuration methods connecting between an air conditioner and an operating information display device

The embodiments will now be described by the accompanying drawings.

Embodiment 1

An air conditioner is required to be accessed by a test operation after construction and before actual operation whether it has been constructed properly and has been exhibiting performance as expected. Thus, a serviceman is required to go to the site in which the air conditioners were constructed and to operate the air conditioners to watch the operating statuses during the test operation. Air conditioners for buildings, hotels, and tenants are configured to include a plurality of indoor units corresponding to one outdoor unit, thus it is a big burden for a serviceman to check each operating status. Therefore, a dedicated device for supporting a serviceman is required.

Such a device is, for example, configured to include a dedicated adaptor for connecting to communication lines of an air conditioner and a personal computer for displaying values of pressure and temperature sensors provided in an air conditioner. However, the dedicated device is expensive and also takes labor to install, so that it costs a lot to introduce the dedicated device for a test operation. Thus, small companies have conducted a test operation and an assessment of operating statuses of air conditioners not using the dedicated device but on the basis of their experiences. In order to have a serviceman assess operating statuses by himself, it is necessary for him to understand refrigerating cycle and operating principles of an air conditioner, requiring a lot of education time and field experiences.

Thus, the present invention provides an operating information display device and a program of a test operation system which is capable of displaying accurately and easily information necessary for an operator to assess a test operating status in a low cost for introduction and operation. In the present embodiment, the configuration of the test operation system will be detailed further using an example illustrated in FIG. 1.

An air conditioner test operation system comprises outdoor units 1 (1a, 1b), indoor units 2 (2a-1 to 2a-3, 2b-1 to 2b-3), a centralized control device 3, a radio adopter 4, a mobile terminal 5, transmission lines for air conditioner communication 6, a broadband radio base station 7, internet 8, a management server 9, a information terminal, and a printer 11.

The outdoor units 1 and the indoor units 2 are connected through refrigerant pipes to form a refrigerating cycle. Though FIG. 1 shows two outdoor units 1 and six indoor units 2, it is enough that one or more for each kind of units are provided. The indoor units 2 are controlled by a remote controller, which is not shown in FIG. 1.

The centralized control device 3 being connected to the outdoor units 1 and the indoor units 2 through the transmission lines for air conditioner communication 6, it monitors and controls the connected units. For example, it is able to perform switching between operation and stoppage, switching operation modes, altering a set temperature, altering a direction and a volume of wind, prohibiting a remote controller operation, and setting a schedule on one or a plurality of devices. Further, it is able to display statuses and alarms of connected units.

The radio adopter 4 is connected to the outdoor units 1 and the indoor units 2 through the transmission lines for air conditioner communication 6. Further, the radio adopter 4 executes data communication with the mobile terminal 5 by radio communication. The radio communication methods are, for example, WiFi®, Bluetooth®, and Zigbee®. In addition, a radio access point (radio base station) may be configured to be inserted between the radio adopter 4 and the mobile terminal 5. The radio adopter 4 transmits present statuses information of the outdoor units 1 and the indoor units 2 to the mobile terminal 5 and controls over the indoor units 1 and outdoor units 2 according to instructions of the mobile terminal 5.

The mobile adopter 5 is further able to be connected to the internet 8 through the broadband radio base station 7. The radio communication methods are, for example, 3G (third Generation), LTE®, WiMax®.

The management server 9 is connected to the internet 8, and it executes data communication with the mobile terminal 5. The management server 9 stores connection information or the like of an air conditioner transmitted from the mobile terminal 5. Further, the management server 9 stores and transmits the data for each air conditioner to the mobile terminal 5 according to instructions of the mobile terminal 5.

An information terminal 10 is connected to the internet 8 and it is able to communicate with the management server 9. It is possible by using the information terminal 10 that connection information of the air conditioners is browsed and the data for each air conditioner are browsed and updated while both are stored in the management server 9.

The printer 11 being connected to the internet 8, it is able to communicate with the mobile terminal 5 and the information terminal 10. It is possible to have the contents displayed on the mobile terminal 5 output to the printer 11 according to instructions of the mobile terminal 5. In addition, the air conditioner test operation system may include ventilation equipment.

Figure 2:
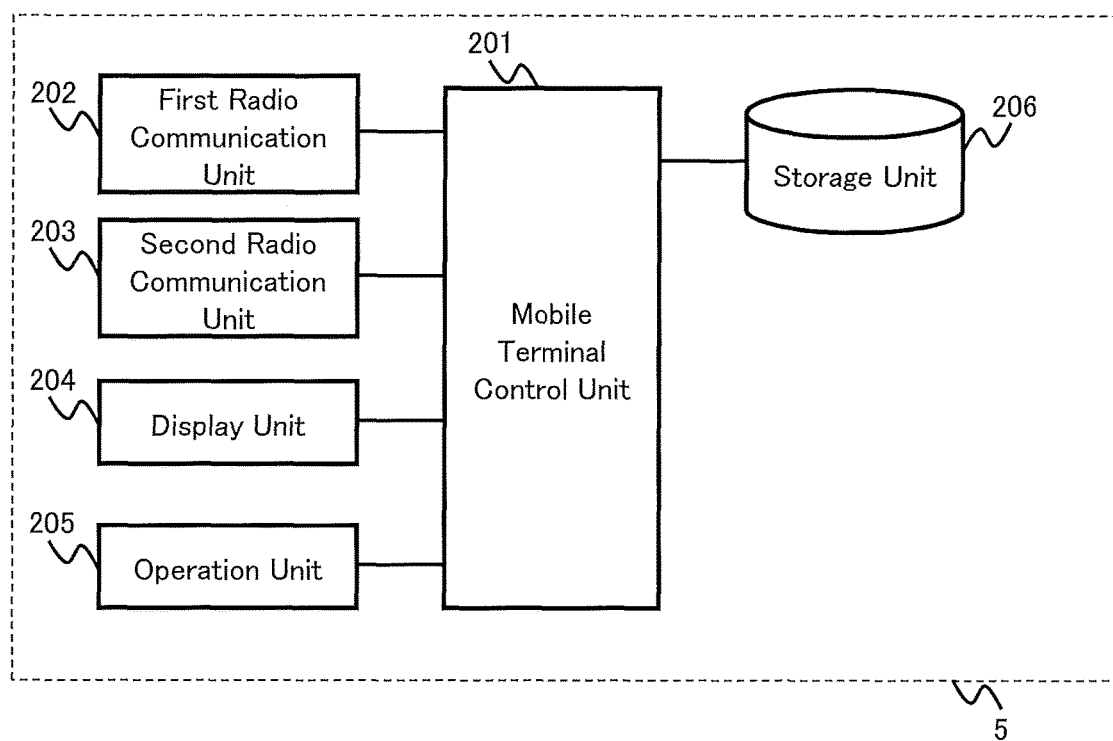
FIG. 2: a schematic view of a mobile terminal in FIG. 1

FIG. 2 illustrates a configuration of the mobile terminal 5 used as a display device of operating information in the above test operation system. A mobile terminal control unit 201 provided with the mobile terminal 5 controls a first radio communication unit 202, a second radio communication unit 203, a display unit 204, an operating unit 205, and a storage unit 206. The first radio communication unit 202 performs radio communication with the radio adopter 4. The radio communication methods are, for example, WiFi®, Bluetooth®, and Zigbee®. The second radio communication unit 203 is connected to the internet 8 through the broadband radio base station 7. The radio communication methods are, for example, 3G (third Generation), LTE®, WiMax®.

The display unit 204 comprising mainly LCD (Liquid Crystal Display) and LED (Light Emitting Diode), it displays various information. The operating unit 205 mainly comprising a button, a switch, and a touch panel, it receives inputs from a user. The storage unit 206 storages the control programs and various setting values of the mobile terminal 5, the present statuses information of the outdoor units 1 and indoor units 2 obtained from the management server 9, and the data obtained from the management server 9. The control programs of the mobile terminal 5 include an air conditioning management application of managing air conditioners by communicating with the radio adopter 4. The air conditioning management application may be either pre-installed in the mobile terminal 5 or downloaded from the management server 9.

Further, the display unit 204, the operating unit 205, and the storage unit may be configured separately as different devices. The display unit 204 and the operating unit 205 may be integrated like a touch panel. Furthermore, the display device in the present embodiment may acquire operating information of air conditioners by any means. Thus, the communication with a server isn't essential, so that the second radio communication unit 203 may be removed. In addition, though in the present embodiment, operating information of air conditioners are obtained from the radio adopter 4 through the first radio communication unit 202, the radio communication unit 202 may be replaced by another information communication means that is able to acquire operating information from air conditioners.

When the test operation system configured as above is assumed, for example, the mobile terminal 5 used as an operating information display device receives operating information in the radio communication unit 202 by radio communication from the radio adopter 4 and stores it in the storage unit 206, and it is controlled by the mobile terminal control unit 201 so as to update the information displayed on the display unit 204 periodically.

Consequently, a serviceman is able to grasp present test operating statuses constantly on the mobile terminal. Using a general-purpose mobile terminal widely used such as a smart phone for an operating information display device can reduce the cost to use a test operation system. Further, as far as he is within a communication range, he doesn't need to continue monitoring in one site to reduce his burden.

However, mobile terminals such as a smart phone have limited screen sizes, so that it is difficult to display the same content as the ones which are displayed on the big screens of terminals such as a PC. Thus, it is necessary even on a small screen for only necessary information to be arranged in an easy-to-see status. In the following, the display device for displaying test operating information to solve the foregoing problem in the present embodiment will be described by an example of a generally used smart phone provided with a touch panel.

Figure 3:
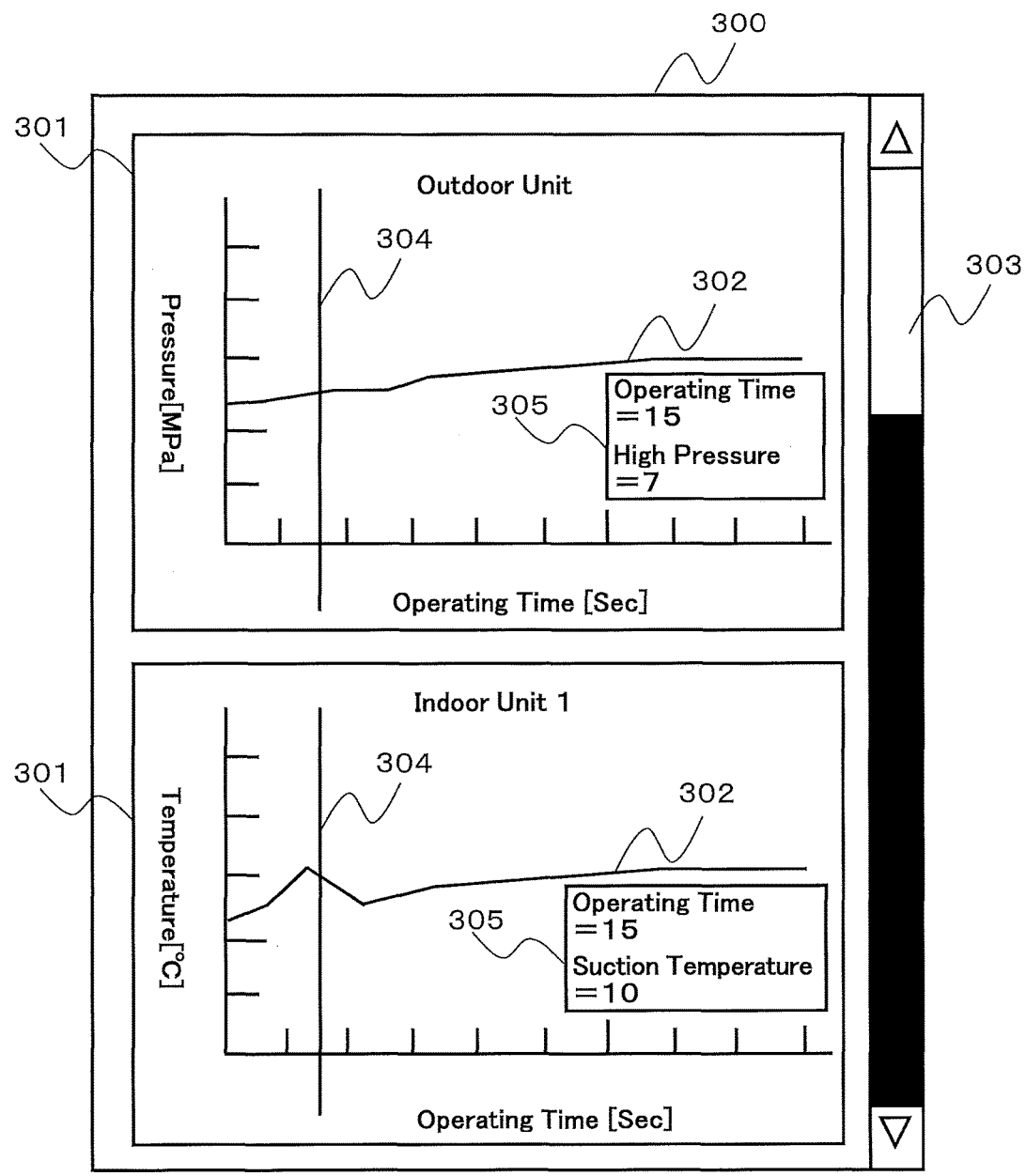
FIG. 3: a diagram illustrating a screen of operating information displayed on the mobile terminal in FIG. 2.

FIG. 3 illustrates a screen on which operating information of the test operation system is displayed. When a user performs a predetermined operation on the operating unit 205, the signal is received by the mobile terminal control unit 201 and an air conditioner test operating program is started. The air conditioner test operating program is an application program executed by the mobile terminal control unit 201. When a user performs a predetermined operation on the operating unit 205 after the air conditioner test operating program is started, the mobile terminal control unit 201 displays the display unit 204 (an operating information display screen 300) with at least two operating information display areas 301 vertically arranged side by side.

In other words, the mobile terminal control unit 201 in the mobile terminal 5 (display device) controls the display unit 204 (operating information display screen 300) so that time information is displayed horizontally, and that a first operating information display area for displaying a first operating information (for example, pressure information on high pressure side) a second operating information area for displaying a second operating information (for example, air humidity on suction sides of indoor units) are displayed vertically or horizontally side by side.

Here, the operating information display area arranged on an upper part of the screen is referred to as the first operating information display area, and the operating information display area displayed below it is referred to as the second operating information display area. Further, the mobile terminal control unit 201 controls the display unit 204 (the operating information display screen 300) so that each operating information display area 301 is represented by a graph consisting of a horizontal axis for indicating operating time and a vertical axis for operating information. Here, the operating information represented by a graph shape is referred to as 302.

Since mobile terminals such as a smart phone are usually hold by using the screens in vertically-long states, it is possible to display a plurality of operating information display areas reasonably on the same screen by arranging the operating information display areas vertically as described above, so that it is easy to compare the operating information between different operating information display areas. In addition, since a vertically long mobile terminal is also assumed to be used horizontally, in this case the display unit 204 is preferably controlled such that the first operating information display area and the second operating information display area are displayed horizontally side by side. Though the following embodiments will assume that these display areas are arranged vertically side by side, the same can be applied to the case in which they are arranged horizontally side by side.

By having the test operating time which is important for assessing test operating statuses indicated as a horizontal axis, it becomes possible for a serviceman to immediately grasp operating information at the same time of a plurality of the operating information display areas 301 arranged vertically side by side and to compare them more easily.

The mobile terminal 5 receives new operating information from the radio adopter 4 in the radio communication unit 202 at constant time intervals according to the lapse of an operating time to store the obtained operating information in the storage unit 206, and it is controlled by the mobile terminal control unit 201 so that the operating information graphs 302 displayed on the display unit 204 are updated.

Specifically, the times displayed corresponding to the horizontal axes in the operating information display area 301 are represented at a predetermined time interval such that later times are set on one side and an earlier times are set on the other side in each time display area, the display unit 204 is controlled by the mobile terminal control unit 201 such that the operating information according to the times is displayed. For example, 10h00m00s is displayed in a first time display area, and 10h00m20s is displayed in a second time display area on the right side, and further 10h00m40s is displayed in a third time display area on the further right side, so that the third time display area displays the latest time. Thus, time display is updated every 20 seconds, in the first update the latest time (10h01m00s) is displayed on the third time display area, and 10h00m40s is displayed on the second time display area, and further 10h00m20s is displayed on the first time display area on the left side.

In other words, the times indicated in the vertical axis are updated to the latest at the predetermined timing, accordingly the operating information is updated. Further, the display unit 204 is controlled by the mobile terminal control unit 201 such that the time having been displayed in the earliest time area is not displayed on the display unit. This enables a serviceman to know the latest operation time constantly and grasp the progress of the operating information on the operating time.

In addition, if a scroll operation is performed on the operating unit 205 horizontally in an earlier time direction, the mobile terminal control unit 201 receives the operation and controls the display unit 204 so that the time display in the time display area of the horizontal axis is replaced by earlier time display according to the size of scroll operation and the operating information for the time is displayed. On the contrary, if a scroll operation in a later time direction is performed on the operating unit 205 from this status, the mobile terminal control unit 201 receives the operation and controls the display unit 204 so that the time display on the time display area of the horizontal axis are replaced by later time display according to the size of scroll operation and the operating information on this is displayed. This enables a serviceman to grasp the past operating information easily.

Further, the display unit 204 (operating information display screen 300) is controlled such that the names of operating units having operating information displayed in the operating information display areas 301 are displayed in any positions of the operating information display areas 301. In the present embodiment, as shown in FIG. 3, the name of an operating unit is shown on the upper part of the operating information display area 301. In addition, assuming a configuration in which a plurality of indoor units is connected to one outdoor unit in the present embodiment, an operating unit name of an outdoor unit is represented as outdoor unit and operating unit names of indoor units are written as indoor unit 1 and indoor unit 2.

A scroll bar 303 is used for controlling operating information display areas other than the first and the second so as to be displayed on the display unit 204 by a scroll operation. In other words, when a scroll operation is performed on the scroll bar 303 (scroll means) vertically (horizontally in case of a horizontally-long screen) by a user, a mobile terminal control unit 201 has the first operating information (pressure information on a high pressure side in FIG. 3) and the second operating information (air information on a suction side of an indoor unit in FIG. 3) displayed on the display unit 204. Here, the scroll bar 303 is not an indispensable configuration requirement, it may be removed when the mobile terminal control unit 201 is able to control the display unit so that display contents of the display unit are transferred, for example, by a vertical sliding operation on the display unit 204 constituted of a touch panel.

It is easier for a serviceman to see operating information on a small screen by selecting operating information display areas to be displayed on the display unit 204 to have the operating information display areas having been hidden displayed on the display unit 204 by a scroll operation as described above.

Here, when a mobile terminal 5 (display device) user performs a selecting operation of selecting a predetermined time among time information on the operating unit 205, the mobile terminal control unit 201 of the mobile terminal 5 (display device) controls the display unit 204 so that an index information 304 for indicating the positions of the first operating information (for example, pressure information on a high pressure side in FIG. 3) or the second operating information (for example, air information on a suction side of an indoor unit) respectively for the predetermined selection time are displayed.

Alternatively, when a mobile terminal 5 (display device) user performs a selecting operation of selecting any positions in the upper and lower areas of the horizontal axis for representing the time information in the first operating information display area 301 (pressure information display area on a high pressure side in FIG. 3), the mobile terminal control unit 201 of the mobile terminal 5 (display device) may control the display unit 204 so that the index information 304 for indicating the time information on a selected position and that the position of operating information are displayed in the first operating information display area 301. In addition, the index information 304 may be either a line shown in FIG. 3 or a maker having any form as far as it indicates a position of operating information at the same operating time. Furthermore, it is preferable that the display correspondence of the index information 304 is able to be arbitrarily set by an operating of the operating unit 205.

The values of operating time indicated by the index information 304 and operating information on the time are displayed as index position operating information 305 in any positions of the operating information display area 301. The index position operating information 305 may be controlled so as to be arranged in any position in the operating information display area 301, for example, on the right end of the operating information display area 301 and close to the position of the index. Further, it is unnecessary for the values of operating time and operating information to be displayed in the same position, they may be controlled by the terminal control unit 201 such that each value is displayed on each axis. In addition, the index position operating information 305 is controlled so as to be displayed in all the operating information display areas 301 having the index information 304.

It is possible for a serviceman to instantly find the accurate values of operating information on a predetermined operating time without reading fine scales in graphs by the index information 304 and the index position operating information 305.

When an operation of displaying the index information 304 is performed by the operating unit 205 on either of a first or a second operating information display areas 301, the mobile terminal control unit 201 preferably performs control such that the index information 304 is displayed in the position of the same operating time even in the operating information display areas 301 not operated. As far as the index information 304 is displayed in the operating information display area 301 on a screen, the same index information 304 is controlled so as to be displayed in the operating information display areas to be appeared in the display area 204 by a scroll operation.

Specifically, when a selecting operation of selecting a predetermined position in the first operating information display area 301 (pressure information on a high pressure side display area in FIG. 3) is performed on the operating unit 205 of the mobile terminal 5 (display device), the mobile terminal control unit 201 controls the display unit 204 so that a first index information 304 for indicating the time information on a predetermined selected position or the position of the first operating information (pressure information on a high pressure side) is displayed. Further, in this status, the mobile terminal control unit 201 controls the display unit so that a second index information 304 for indicating the time information on a predetermined selected position or the position of the second operating information (air temperature on a suction side of an indoor unit in FIG. 3) is similarly displayed even in the second operating information display area (air temperature information display area on a suction side of an indoor unit in FIG. 3). In addition, though the detailed descriptions will be omitted, when a predetermined position in the second operating information display area 301 is selected, similarly the index information 304 is displayed in the first operating information display area 301 (pressure information on a high pressure side in display area FIG. 3).

The index information 304 at the same operating time being displayed in all the operating information display areas 301, it becomes easier to compare operating information accurately and determine the abnormality. For example, when a serviceman set the index information 304 at an occurrence time of an abnormal value in an operating information display area 301, the mobile terminal control unit 201 performs control so that the index information 304 at the same time are shown in all the operating information display areas. Thus, a serviceman is able to compare easily what kinds of operating information other operating units indicated at the same time when an abnormality occurred.

When a user transfers a display position of the index information 304 by operating the operating unit 205, an operating time and operating information indicated by the index are controlled by the mobile terminal control unit 201 so as to have the values on a display position of the index information 304. The index information 304, for example, if the operating unit 205 is a touch panel, can be selected by being touched. The index information 304 can be transferred by being dragged to any position in the operating information graph 302 while being selected, and controlled by the mobile terminal control unit 201 so that the values of an operating time and that operating information indicated by the index information 304 are displayed in the index position operating information 305 according to the transfer of the index.

Namely, when a time alternation operation of altering the selected position in the first operating information display area (pressure information on a high pressure side in FIG. 3) in a time axis direction is performed on the operating unit 205 of the mobile terminal 5 (display device) by a user, the mobile terminal control unit 201 controls the display unit 204 so that the index information 304 for indicating a time information according to a selected position after alteration or a position of the first operating information (pressure information on a high pressure side in FIG. 3) are displayed in the first operating information display area.

In this case, the mobile terminal control unit 201 preferably controls the display unit 204 so that the index information 304 indicating a time information according to a selected position after alteration or a position of the second operating information (air temperature on a suction side of an indoor unit in FIG. 3) are displayed even in the second operating information display area (air temperature on a suction side of an indoor unit in FIG. 3). When a time alteration operation of a selected position is performed in the second operating information display area, the index information 304 in the first operating information display area is operated similarly. In other words, when the index information 304 having been selected is transferred, the mobile terminal control unit 201 performs control so that the index information 304 in all the operating information display areas are transferred accordingly and that the contents of the index position operating information 305 are altered according to the index position.

This enables a serviceman to compare at the same time the operating information that is not displayed in the same operating information display area. For example, when an index is set at a position in which an abnormal value is observed, an index is controlled so as to be transferred to the same position in all other operating information display areas, saving the trouble to set the index position in all other operating information display areas to have the operating information at the same time read accurately and compared.

In the present embodiment, a test operation configured to include a plurality of indoor units 2 for an outdoor unit 1 being assumed, a serviceman assesses the test operating statuses by comparing operating information of the outdoor unit and operating information of each indoor unit on a predetermined operating time.

Accordingly, the mobile terminal control unit 201 is intended to control the display unit 204 so that the operating information of an outdoor unit 1 is shown above the operating information of an indoor unit 2 out among the operating information displayed on the display unit 204. In addition, the operating unit includes a constant display means not illustrated of displaying a predetermined operating information constantly in the first operating information display area, when an operation of displaying an operating information (for example, pressure on a discharge side) of an outdoor unit constantly is performed, the mobile terminal control unit 201 controls the display unit 204 so that operating information (for example, pressure on a discharge side) of an outdoor unit are displayed constantly in the first operating information display area on an operating information screen 300.

This prevents a serviceman from searching for operating information of outdoor units browsed frequently by a scroll operation, so that he is able to compare easily between operating information of an outdoor unit and operating information of each indoor unit on the display area 204.

Further, even though each operating unit has a lot of operating information, the mobile terminal control unit 201 performs control so that, for example, the operating information on pressure for outdoor units and that the operating information on temperature for indoor units are only displayed on the display unit 204 in the initial status after an application for a test operation system is started in the mobile terminal 5. The mobile terminal control unit 201 performs control so that the operating information displayed on the display area 204 is alterable by an operation performed on the operating unit 205 by a user.

Figure 4:
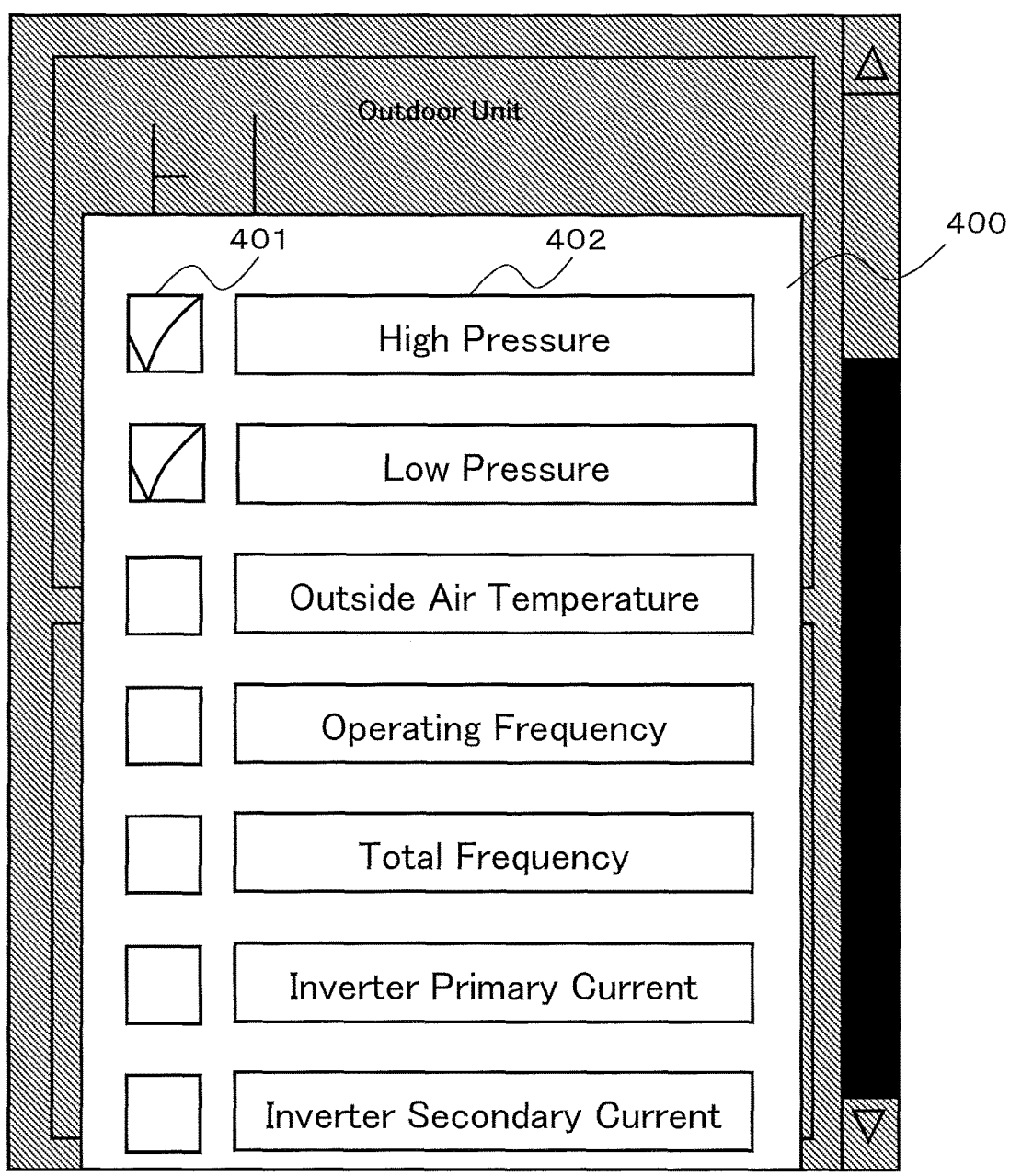
FIG. 4: a diagram illustrating a method of selecting the operating information displayed on the screen of FIG. 3

FIG. 4 illustrates an example of the screen on which operating information to be displayed in an outdoor unit is selected. The present embodiment comprises an operating status display selection means of selecting which operating status among all operating information are to be displayed in the first operating information display area or the second operating information display area. When a user performs a predetermined operation on the operating unit 205, the mobile terminal control unit 201 controls the display unit 204 so that the operating information selection screen 400 is displayed. As an operation example of a user, if the operating unit 205 is a touch panel, for example, a method of a long pressing on the part of operating unit name in an operating information display area is given. Though in FIG. 4 the operating information selection screen 400 is displayed on the operating information display area 300 shown in black, the way of display is not limited to this, for example, the operating information selection screen 400 is controlled to be configured to be displayed on the whole screen by the mobile terminal unit 201.

401 denotes a check box indicating a selection status of operating information, and 402 denotes an operating information name given to each operating unit. It is not necessary for 401 to have a shape of a check box as far as a selection status is recognized, it may have a shape like a button of which color changes depending on whether it is selected. Further, 401 is not a required item, and a selection status of operating information may be indicated by altering a color of 402 as far as which 402 is selected is recognized.

Assuming the operating information selection field 400 is dealt with a scroll operation, it is used in performing control so that information names protruding from the display unit 204 are displayed on the display unit 204. In case of assuming a smart phone as the present embodiment, a user is able to scroll by a sliding action on a touch panel. When the operating unit 205 is not a touch panel, the mobile terminal control unit 201 performs control so that a scroll bar is displayed on the operating information selection screen 400. When the operating information selection screen 400 is turned off by an operation on the operating unit 205 by a mobile terminal 5 user after operating information is selected, the mobile terminal control unit 201 displays again on the display screen 204 the operating information display screen 300. The operating information display areas 301 having selected operating information are displayed by the mobile terminal unit 201 on the operating information display screen 300 to be displayed. As a method of turning off the operating information selection screen 400, the method of providing a button for turning off a screen in the operating information selection screen 400 is given. When the operating unit 205 is a touch panel, either the method of sliding to the right while touching the operating information selection screen 400 or the method of switching screens by a long pressing on any position on the operating information selection screen 400 may be applied.

As mentioned above, it becomes possible for a serviceman to be visibly provided with necessary data even when the display unit 204 is small by performing control so that only important operating information is displayed in the initial status and having the operating information to be displayed selected as needed.

Since outdoor units and indoor units have different items of operating information from each other, the mobile terminal control unit 201 needs to alter operating information names 402 to be displayed on the operating information selection screen 400 depending on which is selected between an outdoor unit or an indoor unit.

Here, operating information given to each operating unit is, in case of outdoor units, the information indicating the operating status of an air conditioner including a pressure on a high pressure side, a pressure on a low pressure side, an outside air temperature, an operating frequency of a compressor, a total frequency of a plurality of compressors in case of a plurality of compressors being provided, an inverter primary current, an inverter secondary current, a temperature of compressor discharged gas pipes, a FAN operating status, an opening degree of an expansion valve, and a temperature of heat exchanger pipes. Similarly, in case of indoor units, it is the information indicating the operating status of an air conditioner including a sucked air temperature, a discharged air temperature, a temperature difference between a sucked air temperature and a discharged air temperature, a set temperature, an operation mode, a set wind volume, a temperature of refrigerant pipes, a temperature of refrigerant gas, an alarm code, a remote thermister, and an opening degree of an expansion valve.

Further, the mobile terminal control unit 201 performs control so that the operating information which has been determined as especially important among the operating information names 402 are arranged in the upper part of the operating information selection screen 400. This enables a serviceman to select frequently used operating information immediately without a scroll operation.

Furthermore, some operating information items such as an operation mode and an alarm code can be difficult to be represented by values of vertical axes according to horizontal axes. The mobile terminal control unit 201 either performs control so that such items are displayed as graphs by arranging contents of the horizontal axis, or a mode setting or the like is represented by changing colors of background areas of graphs according to operating time. The mobile terminal control unit 201 either performs control so that a small area for indicating a current status is provided additionally in the operating information display areas. The small area for indicating a current status refers to as, for example, a small icon and a label which show a present operation mode. However, when a change of operation mode and an alarm occur during operation, it is necessary that at which operating time the phenomena has occurred is shown. Thus, when operating information is displayed using a small area for indicating a present status, the mobile terminal control unit 201 performs control so that the marker indicating that a change has occurred mainly on the operating time axis is displayed in the operating time position in which observed operating information has been changed.

Figure 5:
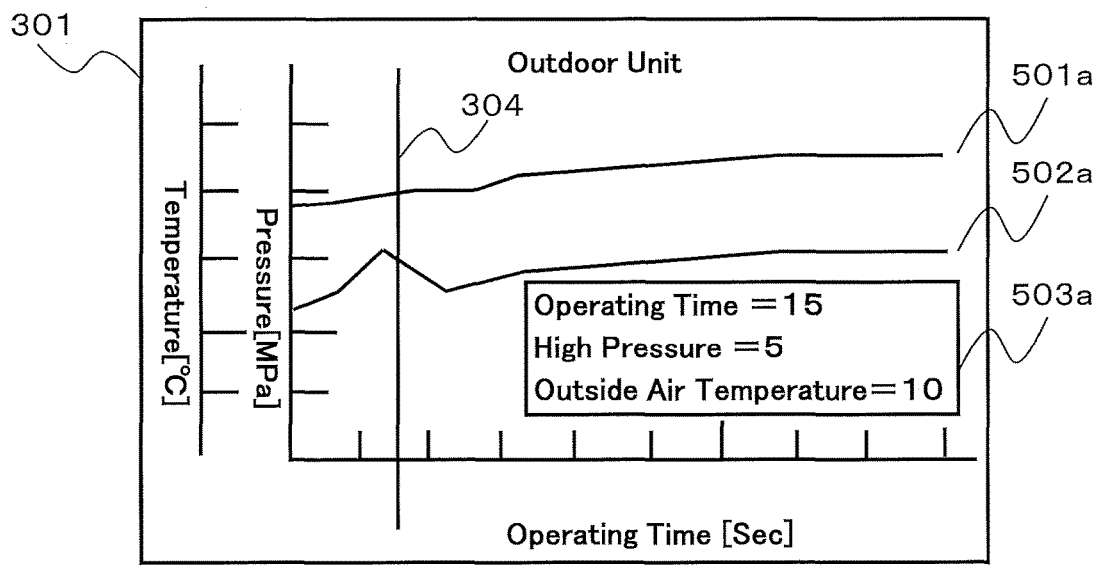
FIG. 5: examples in which a plurality of operating information is displayed in an operating information display area 301 in FIG. 3
Figure 5:
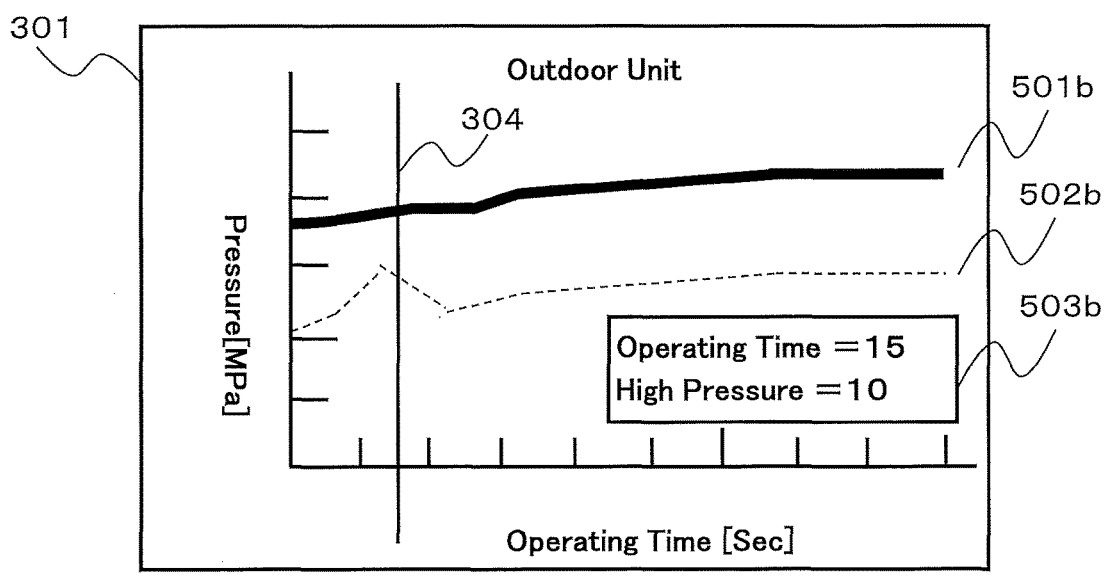

FIG. 5 illustrates examples in which a plurality of operating information is displayed on one operating information display area 301. FIG. 5(*a*) is an example in which two vertical axes are displayed in the operating information display area, while FIG. 5(*b*) is an example in which only one vertical axis is displayed. The mobile terminal control unit 201 may either performs control so that each operating information in FIG. 5 (*a*) is displayed on the display area 301 one by one, or if operating information is intended for the same operating unit (an outdoor unit 1 or an indoor unit 2) so that a plurality of operating information is displayed in the same operating information display area 301. Namely, when the first operating information 501*a* (pressure information on a high pressure side in FIG. 5 (*a*)) is operating information on predetermined outdoor unit or indoor unit (an outdoor unit in FIG. 5(*a*)), further when a predetermined operation is performed on the operating unit 205, the mobile control unit 201 having received this operation signal controls the display unit 204 so that other operating information 502*a* (outside air temperature in FIG. 5(*a*)) on the outdoor unit or indoor unit (an outdoor unit in FIG. 5(*a*)) is displayed in the operating information display area 301 together with the first operating information 501*a*.

It is possible for a serviceman to see operating information of the same operating unit without a scroll operation and grasp instantly operating information which he deals with by displaying operating information of the same operating unit (an outdoor unit or an indoor unit) in one operating information display area. Further, even if the number of displayed operating information increase, it becomes possible to have, for example, operating information of an outdoor unit displayed in the first operating information display area and an operating information of an indoor unit displayed in the second operating information display area or decrease by using an operating information display area for each operating unit, making it easier to compare operating information between an outdoor unit and each indoor unit on a screen.

Further, the mobile terminal control unit 201 preferably controls the display unit 204 so that the graphs of respective operating information (501*a*, 502*a*) are displayed by different colors and kinds of lines (dotted line, rigid line, thickness or the like) previously determined. This enables operating information to be displayed so as to be easily seen by a serviceman. Furthermore, it is preferable that such colors and kinds of lines (dotted line, rigid line, thickness or the like) of graphs are altered arbitrarily by a user. In other words, when a user performs an operation of altering graph forms on the mobile terminal unit 205, the mobile terminal control unit 201 having received the operation signal controls the display unit 204 so that the graphs are displayed by set colors and kinds of lines.

When an operating information is displayed in an operating information display area 301 one by one, the mobile terminal control unit 201 controls the display unit 204 such that the operating information display areas 301 are displayed on the operating information display screen 300 according to the arrangement order in which the operating information names 402 are arranged on the operating information selection screen 400.

When a plurality of operating information is displayed in the same operating information display area 301, the mobile terminal control unit 201 may perform control either so that a vertical axis is described for each operating information, or so that when operating information is displayed on a vertical axis in the same unit, for example, high pressure and low pressure, the operating information is displayed using the same vertical axis. Further, the mobile terminal control unit 201 may perform control so that only one vertical axis is displayed constantly.

When a plurality of operating information is displayed on the same operating information display areas 301, the mobile terminal control unit 201 performs control such that either one of operating information graphs in the display area is made to be a selection status by an operation on the operating unit 205 by a user. In the present embodiment, a status in which either of operating information graphs is selected is called an active status.

Operating information which has been active is controlled by the mobile terminal control unit 201 so as to be displayed by contrast by a bold line and a color change shown as in 501*b*. Further, other inactive operating information is controlled so as to be displayed distinct from active operating information by using dotted lines or gray and pale colors shown as in 502b.

When only one vertical axis is shown as FIG. 5 (b), the mobile terminal control unit 201 performs control so that the vertical axis for active operating information is only shown. When the operating unit 205 is a touch panel, operating information made to be active is able to be altered by touching the graph lines of respective operating information.

Every time active operating information is switched by an operation by a user, the mobile terminal control unit 201 performs control so that a vertical axis of FIG. 5 (b) is switched to the vertical axis for active operating information. Namely, when the operation of selecting either the first operating information 501b (pressure information on a high pressure side in FIG. 5 (b)) or another operating information 502b (outside air temperature in FIG. 5(b)) is performed to the operating unit 205 of the mobile terminal 5 (here operating information 501b is selected), the mobile terminal control unit 201 controls the display unit 204 so that the size information of the vertical axis for the selected operating information 501b (pressure information on a high pressure side in FIG. 5(b)) is displayed by contrast in the first operating information display area. FIG. 5(b) displays by contrast the size information of the pressure information by displaying only the vertical axis that indicates size information of the pressure information and not displaying the vertical axis that indicates size information of the temperature information.

Only one vertical axis being provided even if a plurality of operating information is shown, it doesn't take a waste space for displaying axes to enable operating information to be displayed visibly using a large space even on the display unit 204 of a limited size. Further, when a plurality of axes is shown, it is difficult to grasp instantly which axis corresponds to which operating information, however, the correspondences between axes and operating information are instantly recognized by displaying by contrast the axis of active operating information.

The mobile terminal control unit 201 performs control so that the operating time indicated by the index information 304 and that the values of all operating information on the time in the same operating information display area are displayed in the index position operating information 503a and 503b. It is not necessary for such operating information to be displayed in the same position, but either may be controlled so as to be displayed close to the graphs of respective operating information, or may be controlled so as to be displayed in the vicinity of the axes. Further, the mobile terminal performs control either so that the values of all operating information in the same operating information display area are indicated as 503a, or the value of active operating information is only shown as 503b.

When the values of all operating information in the operating information display area are displayed as 503a, it is convenient for a serviceman because he knows an operating time and all operating information in the index position without seeing each operating information graph. Further, when there is too much operating information to be displayed and the display of the index position operating information becomes complicated, the display of only the value of active operating information as 503b makes it easier a user to see. It is possible that which display format is used is selected by an operating on the operating unit 205 by a user.

When a plurality of indoor units is provided, it is difficult to compare operating information between an outdoor unit and each indoor unit. The index information 304 transferred accordingly in all operating information display areas enable a user to know the values of operating information at the same time in each operating information area. However, when a whole tendency is compared instead of values for a predetermined time, it is inconvenient to be provided with only index information. Thus, the following functions are provided.

Figure 6:
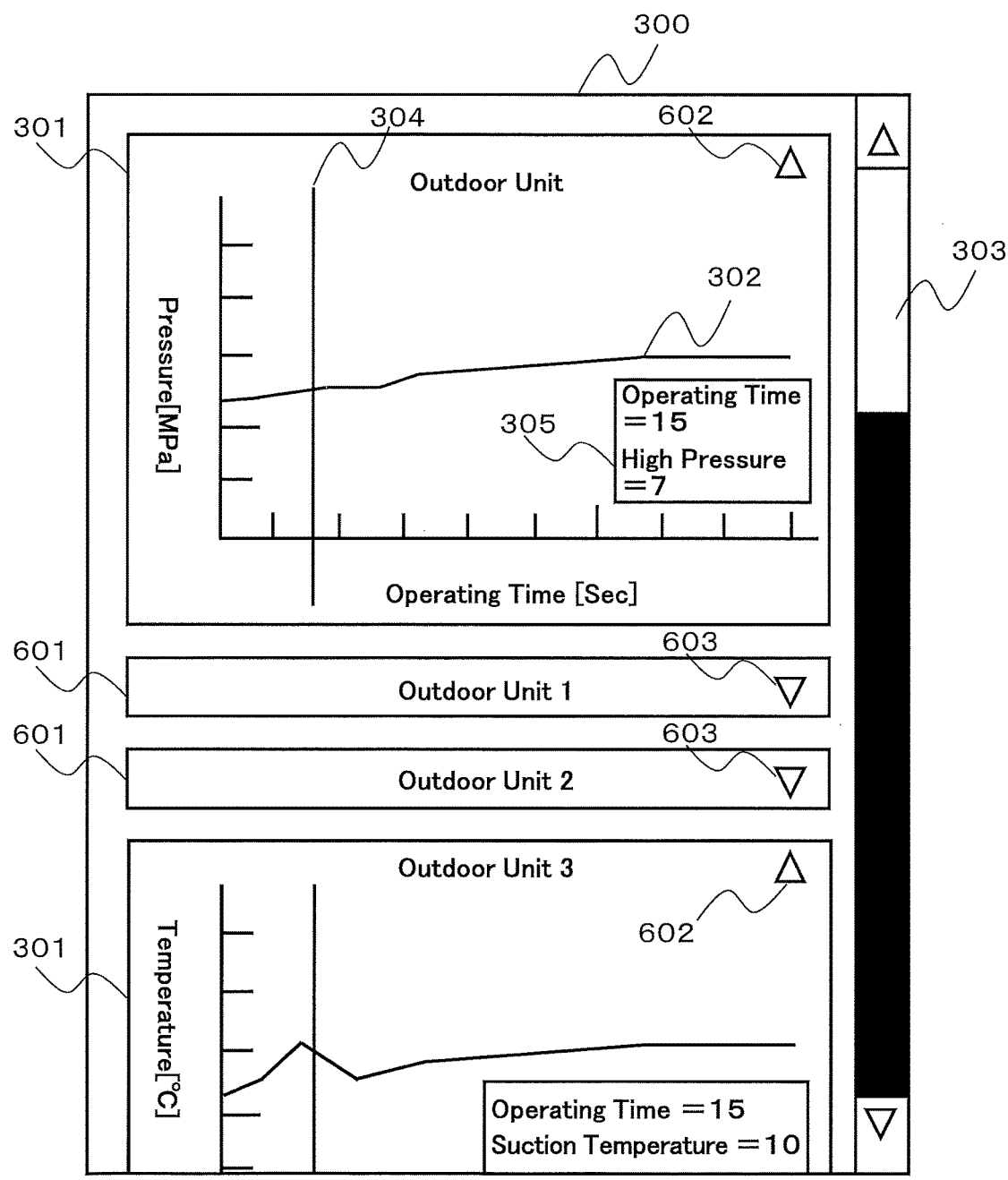
FIG. 6: a screen example in a status that some operating information display areas of FIG. 3 are folded.

FIG. 6 is an example of the operating information display screen in which the operating information display area 301 and 601 which are status in which 301 are folded are displayed on the display area 204 by the mobile terminal control unit 201. Namely, the present embodiment includes a operating information hiding means of hiding operating information displayed on the display unit 204, and when a mobile terminal 5 user performs a hiding operation for a predetermined operating information on the operating information hiding means, the mobile terminal control unit 201 controls the display area 204 so that the operating statuses excluding the operating information which a hiding operation deals with are displayed in the first operating information display area or the second operating information display area.

As an operating information hiding means, for example, the marks such as a triangle directed upward like 602 or an arrow are displayed in predetermined positions such as the upper right or the lower right in the operating information display area 301. When a mobile terminal 5 user selects the marks through the operating unit 205, the mobile terminal control unit 201 having received this operation signal controls the display unit 204 so that the operating information graph in the operating information display area 301 is not displayed and that only the operating unit name is shown like 601. This is called a status in which an operating information display area is folded.

By having marks such as a triangle directed downward as 603 and an arrow displayed on the folded display area 601 and having a user select such marks by the operating unit 205, the mobile terminal control unit 201 having received this operation signal controls the display unit 204 so that the operating information display area 301 appears again on the operating information display screen 300. It is not necessary that a folding and developing method is not limited to this method, for example, folding and developing operation may be performed in such a way operating unit names in the operating information display area are selected by an operation through the operating unit 205 by a user. In this case, folding and developing buttons of display areas and 602/603 shown as marks are not indispensable. This means deletes unnecessary operating information from the display area 204, and enables a user to compare only necessary operating information of operating units on the display unit 204.

Further, such a display device comprises a means of altering the arrangement order of the operating information display areas 301. When the operating information display area 301 or the 601 which is a status in which 301 are folded, for example, where the operation unit 205 is a touch panel, are operated to be driven or slid to the right side of the screen while being touched by a finger, the mobile terminal control unit 201 having received this operation signal controls the display unit 204 so that the operated 301 or 601 is removed from the display column or transferred to the bottom of the column.

Repeating this makes it possible to arrange the operating information of an indoor unit having been in the lower order of the display column to the upper order. An indoor unit having been in the lower order is able to be displayed together with an outdoor unit on the display unit 204, enabling a serviceman to compare easily operating information on the same screen.

The display device further comprises a method for returning an arrangement order and a display status of operating information to an initial status.

Screen examples having the first and second operating information display areas have been given. However, if the first, the second, and the third operating information display areas are able to be displayed on a screen, operating information will be compared more smoothly.

For example, the mobile terminal control unit 201 performs control so that high pressure and low pressure of outdoor units are displayed in the first operating information display area, outside air temperature of outdoor units is displayed in the second operating information display area, and operating information on temperature of indoor units are displayed on the third operating information display area in an initial status. While temperature is the most important factor for an indoor unit, for an outdoor unit both pressure and temperature are important factors for assessing a test operating status, thus displaying in such a way in initial status enables a user to grasp instantly a status of an outdoor unit, which is compared easily with the operating information of indoor units on the third operating information display area.

Further, the mobile terminal control unit 201 performs control so that the operating information of an outdoor unit, an indoor unit 1, and an indoor unit 2 are displayed respectively in the first, the second, and the third operating information display areas. This enables a serviceman to grasp instantly and compare operating information of more operating units.

The display device of a test operating information and an application program executed thereby as mentioned above are not limited to a smart phone, but used in a PDF, a tablet, a cellular phone, and PC. When a screen is not a touch panel, operations on a screen are able to be replaced by click operations mainly through a mouse or operations by a button and a keyboard.

Further, though the numerical values corresponding to the scales are omitted in the axes of the graphs illustrated in the diagrams, in using the graphs as actual screens, the numerical values corresponding to the scales are described in the appropriate positions around the axes. It is not necessary for the numerical values to be described corresponding to all scales, however it is necessary for the values of the minimum position and maximum position of the axis scale or the degree of size per one scale to be described so as to be understood by a user. Furthermore, though radio communication is used as the operating information acquisition means provided in a mobile terminal, it is able to be replaced by wired communication.

REFERENCE SIGNS LIST

5 mobile terminal
201 mobile terminal control unit
204 display unit
205 operating unit
206 storage unit
300 operating information display screen
301 operating information display area
302 operating information graph
303 scroll bar
304 index information
305 index position operating information
400 operating information selection screen
402 operating information name
501*b* active operating information graph
502*b* inactive operating information graph
601 folded operating information display area

What is claimed is:

1. A mobile terminal comprising:
a controller;
a display connected to the controller;
a memory connected to the controller that stores operation information of an air conditioner having an indoor unit including an indoor heat exchanger and an outdoor unit including an outdoor heat exchanger and a compressor, the indoor unit being connected with the outdoor unit through refrigerant pipes, and the compressor circulating a refrigerant,
wherein the controller is configured to:
display a first display area that includes a first time-series of first operation information indicating first data of the air conditioner, and first time information displayed along a horizontal axis,
display a second display area that includes a second time-series of second operation information indicating second data of the air conditioner, and second time information displayed along a horizontal axis, and
upon receiving a first selection of a first position of the first display area, display a first marker of the selected first position in the first display area that indicates a first time position of the first time information and that indicates a first position of the first operation information on the first time-series of first operation information corresponding to the first time position and simultaneously display a second marker in the second display area that indicates the first time position of the second time information and that indicates a first position of the second operation information of the second time-series of second operation information corresponding to the first time position,
wherein the first operation information indicates first data of one of the outdoor unit and the indoor unit and a third time-series of third operation information indicates third data of the other of the outdoor unit and the indoor unit indicated by the first operation information,
wherein the data of the first operation information and the data of the third operation information have different units from each other, and
wherein the controller is further configured to:
display in the first display area the third time-series of third operation information indicating the third data, and
display the respective units on different vertical axes in the first display area.

2. The mobile terminal according to claim 1, wherein the controller is further configured to:
Upon receiving a second selection of a second position of the first display area, that differs from the selected position with respect to time information along the horizontal axis, display the first marker in the first display area, where the first marker indicates a second time position of the first time information and where the first marker indicates a second position of the first operation information on the first time-series of first operation information corresponding to the second time position and simultaneously display the second marker in the second display area, where the second marker indicates the second time position of the second time information and where the second marker indicates a second position of the second operation information of the second time-series of second operation information corresponding to the second time position.

3. The mobile terminal display device according to claim 1,
wherein the first operation information indicates data of either the outdoor unit or the indoor unit of the air conditioner, and the second operation information indicates data of either the outdoor unit or the indoor unit of the air conditioner,
wherein the data of the outdoor unit indicates at least one of an operating frequency, pressure on a high pressure side, pressure on a low pressure side, inverter primary current, inverter secondary current, outside air temperature of the compressor, and a total operational frequency of a plurality of compressors, and
wherein the data of the indoor unit indicates at least one of sucked air temperature, discharged air temperature, a temperature difference between the sucked air temperature the discharged air temperature, and a set temperature.

4. The mobile terminal according to claim 1,
wherein the controller is configured to:
receive an input to scroll the display to display information other than the information displayed in the first display area and the second display area.

5. The mobile terminal according to claim 3,
wherein the controller is configured to:
receive a selection indicating one or more data of the outdoor unit to be indicated by the first operation information or the second operation information, and
receive a selection indicating one or more data of the indoor unit to be indicated by the first operation information or the second operation information.

6. The mobile terminal according to claim 1,
wherein the controller is configured to:
display the first time-series of first operation information in a different style than the third time-series of third operation information.

7. A non-transitory computer readable medium storing an application program executed by a mobile terminal comprising a controller, a display connected to the controller, and a memory connected to the controller that stores operation information of an air conditioner having an indoor unit including an indoor heat exchanger and an outdoor unit including an outdoor heat exchanger and a compressor, the indoor unit being connected with the outdoor unit through refrigerant pipes, and the compressor circulating a refrigerant, the application program comprising:
displaying a first display area that includes a first time-series of first operation information indicating first data of the air conditioner, and first time information displayed along a horizontal axis;
displaying a second display area that includes a second time-series of second operation information indicating second data of the air conditioner, and second time information displayed along a horizontal axis; and
upon receiving a first selection of a first position of the first display area, display a first marker of the selected first position in the first display area that indicates a first time position of the first time information and that indicates a first position of the first operation information on the first time-series of first operation information corresponding to the first time position and simultaneously display a second marker in the second display area that indicates the first time position of the second time information and that indicates a first position of the second operation information of the second time-series of second operation information corresponding to the first time position,
wherein the first operation information indicates first data of one of the outdoor unit and the indoor unit and a third time-series of third operation information indicates third data of the other of the outdoor unit and the indoor unit indicated by the first operation information,
wherein the data of the first operation information and the data of the third operation information have different units from each other, and
wherein the program further comprises steps of:
displaying in the first display area the third time-series of third operation information indicating the third data, and
displaying the respective units on different vertical axes in the first display area.

8. The mobile terminal of claim 1,
wherein the controller is configured to:
display, in the first display area, a value of the first time position and a value of the first position of the first operation information of the first time-series, and
display, in the second display area, a value of the second time position and a value of the second position of the second operation information of the second time-series.

* * * * *